(12) United States Patent
Hudgins

(10) Patent No.: US 9,384,383 B2
(45) Date of Patent: Jul. 5, 2016

(54) STYMIEING OF FACIAL RECOGNITION SYSTEMS

(71) Applicant: J. Stephen Hudgins, Blacksburg, VA (US)

(72) Inventor: J. Stephen Hudgins, Blacksburg, VA (US)

( * ) Notice: Subject to any disclaimer, the term of this patent is extended or adjusted under 35 U.S.C. 154(b) by 335 days.

(21) Appl. No.: 14/025,229

(22) Filed: Sep. 12, 2013

(65) Prior Publication Data

US 2015/0261995 A1     Sep. 17, 2015

(51) Int. Cl.
*G06K 9/00*  (2006.01)

(52) U.S. Cl.
CPC .............. *G06K 9/00248* (2013.01); *G06K 9/00* (2013.01); *G06K 9/0061* (2013.01); *G06K 9/00281* (2013.01)

(58) Field of Classification Search
CPC ... G06F 3/017; G06F 3/0304; G06K 9/00281; G06K 9/00255; G06K 9/00248; G06K 9/0061; G06K 9/00; G06K 9/00597; G06K 9/3216; G02B 2027/0178; A61B 5/6803; A61B 5/1077; A61F 9/045; A61F 9/04; A61F 9/06; Y10T 16/526; A62B 18/04; H04N 5/2254; G09B 9/307; G02C 5/124; G02C 7/08; G02C 7/16; G07C 9/00158; F01B 11/001; F25B 2309/001; F25B 9/14; G11B 7/005; G11B 7/08505
USPC .............. 382/100, 103, 115, 118; 345/8, 256, 345/420, 647, 633, 660
See application file for complete search history.

(56) References Cited

U.S. PATENT DOCUMENTS

| | | | |
|---|---|---|---|
| 2,183,885 A | 12/1939 | Heavyside | |
| 4,779,972 A | 10/1988 | Gottlieb | |
| 4,797,956 A * | 1/1989 | Boyce | A61F 9/025 128/206.19 |
| 5,886,822 A * | 3/1999 | Spitzer | G02B 27/0172 359/630 |
| 6,173,068 B1 | 1/2001 | Prokoski | |
| 6,349,001 B1 * | 2/2002 | Spitzer | G02B 27/017 345/8 |
| 6,633,655 B1 | 10/2003 | Hong et al. | |
| 8,192,019 B2 | 6/2012 | Hsu | |
| 8,515,139 B1 | 8/2013 | Nechyba et al. | |

(Continued)

OTHER PUBLICATIONS

Isao Echizen, "Privacy Protection Techniques Using Differences in Human and Device Sensitivity—Protecting Photographed Subjects Against Invasion of Privacy Caused by Unintentional Capture in Camera Images—", Dec. 12, 2012, 5 pages, NII Press Release, http://www.nii.ac.jp/.

(Continued)

*Primary Examiner* — Vu Le
*Assistant Examiner* — Aklilu Woldemariam
(74) *Attorney, Agent, or Firm* — Stephen J. Weyer; Stites & Harbison PLLC

(57) ABSTRACT

For surreptitiously stymieing a recognition of facial characteristics by a facial recognition system using a camera, a user wears an object in front of at least one eye, where the object includes a light displacer. The light displacer optically displaces light radially relative to the original light direction, but still parallel to the original light direction so that a view by the eye through the light displacer is not distorted. With the light displacer, there is an apparent position of the eye perceived by the camera which is shifted relative to other features of the face and relative to the actual position of the eye. Consequently, an image of the face obtained by the camera locates the eye at the apparent position which is substantially different from an image which would have been obtained with the actual position of the eye, so that the facial recognition system is stymied.

22 Claims, 4 Drawing Sheets

(56) References Cited

U.S. PATENT DOCUMENTS

| | | | |
|---|---|---|---|
| 8,836,768 B1* | 9/2014 | Rafii | G06F 3/017 345/420 |
| 2005/0031173 A1* | 2/2005 | Hwang | G06K 9/00597 382/118 |
| 2006/0177109 A1 | 8/2006 | Storch | |
| 2008/0055538 A1* | 3/2008 | Kobayashi | A61F 9/028 351/62 |
| 2008/0088646 A1* | 4/2008 | Sako | H04N 13/044 345/647 |
| 2008/0285801 A1 | 11/2008 | Heinzmann et al. | |
| 2010/0080418 A1 | 4/2010 | Ito | |
| 2010/0191541 A1 | 7/2010 | Prokoski | |
| 2011/0187638 A1* | 8/2011 | Chao | G06F 3/01 345/156 |
| 2012/0140167 A1* | 6/2012 | Blum | A61F 2/1624 351/159.34 |
| 2012/0147317 A1* | 6/2012 | Loeb, Jr. | G02C 7/06 351/55 |
| 2012/0177248 A1 | 7/2012 | Shuster | |
| 2012/0236253 A1* | 9/2012 | Altemare, Jr. | G02C 3/003 351/153 |
| 2013/0135353 A1* | 5/2013 | Wheeler | G09G 3/003 345/660 |
| 2013/0154913 A1* | 6/2013 | Genc | G06F 3/012 345/156 |
| 2013/0169682 A1* | 7/2013 | Novak | G02B 27/017 345/633 |
| 2014/0071400 A1* | 3/2014 | Gao | G06K 9/00604 351/210 |
| 2014/0118225 A1* | 5/2014 | Jerauld | A61B 5/486 345/8 |
| 2015/0261995 A1* | 9/2015 | Hudgins | G06K 9/0061 382/118 |

OTHER PUBLICATIONS

International Search Report with Written Opinion for PCT/US2014/055059, dated Feb. 6, 2015.

International Preliminary Report on Patentability, PCT/US2014/055059, Issued on Mar. 15, 2016.

Written Opinion of the International Searching Authority, PCT/US2014/055059, Issued on Feb. 6, 2015 (previously submitted—Mar. 24, 2015).

* cited by examiner

STYMIEING OF FACIAL RECOGNITION SYSTEMS

BACKGROUND OF THE INVENTION

Facial recognition technology has, at the time of filing of this application, mainly been used in the United States by various national security agencies and police forces. While there has been some use of facial recognition technology in the private sector, these have been fairly limited. However, facial recognition technology has recently been incorporated in private security systems, such as those used for gambling casinos, and as a component in other software systems such as FACEBOOK, just to name a few of those applications. Fortunately, or unfortunately, depending on one's perspective, technology prognosticators have predicted an explosion in commercial products employing facial recognition technology in the fairly near future.

Facial recognition technology generally requires three functional components: a) an image of a face, which is taken from a digital camera or a video frame taken from a video camera, or any other image taken by a suitable camera and which can be digitized; b) facial recognition software to analyze the acquired image of the face; and c) a computer or other computational equipment needed to run the software and provide a database or a link to a database. Because all three of these components are becoming increasingly powerful, cheaper, and smaller quickly, it is believed that facial recognition is no longer going to be primarily limited to governmental security functions but instead will find itself incorporated in a wide array of other government and non-government activities and in particular commercial applications.

It will be appreciated that many facial recognition systems operate by obtaining an image of the person's face to be identified, and then by quantifying the location of various anatomical points or nodal points (landmarks) of the face, including the location(s) of the eye(s) as well as parts of and around the eye(s). The dimensions, locations and/or ratios of these points typically make up a "faceprint", which is then compared to a database of similar metrics (faceprints) to determine, where there is a match from the database, the identity of the face being scanned.

Thus, while the legitimate security functions of government and police agencies should not be circumvented, there are many individuals that would desire not to have their identity automatically and secretly determined in a non-security setting, such as inside a shopping mall. Fortunately, facial recognition technology is still not foolproof. Obviously, if one wears a mask over one's face, covers one's face with one's hand, or wears a fake nose and glasses, the recognition systems can be easily disrupted or potentially defeated. However, most people would not desire to walk around with a sock cap or the like pulled down over their face or with their hand or a magazine held up in front of their face for this obvious purpose, and in doing so would likely be recognized as doing so for the purpose of facial recognition system disruption.

Large dark sunglasses can also be worn in an attempt to disrupt a facial recognition system. However, the problem with large dark sunglasses is that they can be seen by others, and can be seen as an attempt to hide identity in locations such as a shopping mall where dark glasses are not typically used. Furthermore, dark sunglasses tend to reduce light levels, and therefore reduce vision under lower light conditions such as at night or indoors.

Thus, it would be useful to have a method or device which would not be obvious to passersby or a facial recognition system as a facial recognition stymier or an attempt to defeat a facial recognition system, but which would alter ones appearance or facial characteristics as one passes by a facial recognition system surreptitiously.

BRIEF SUMMARY OF THE INVENTION

In accordance with the present invention, there is provided a method and apparatus for surreptitiously stymieing a recognition of facial characteristics of an individual by a facial recognition system, where the facial recognition system is designed to determine the locations of the eyes of a face of the individual as well as the location of other facial features of the individual when viewed by a camera of the facial recognition system. Stymieing of the facial recognition system is achieved by wearing of an object by the individual in front of the eyes of the individual, where the object includes a light displacer located adjacent at least one of the eyes of the individual but otherwise not covering other facial features. The light displacer optically displaces light passing therethrough radially relative to the original light direction, but with the emerging radially displaced light being parallel to the original light direction. As a result, light reflected from the at least one of the eyes of the individual and passing through the light displacer to the camera is displaced radially but parallel relative to a direction of the reflected light received by the camera of the facial recognition system. With these effects, an individual's view by the at least one eye through the light displacer is not distorted. In addition, there is an apparent position of the at least one eye perceived by the camera looking through the light displacer which is shifted relative to other features of the face perceived by the camera by light not passing through the light displacer and relative to the actual position of the at least one eye. Consequently, an image of the face of the individual obtained by the camera of the facial recognition system locates the at least one eye at the apparent position which is substantially different from an image which would have been obtained with the actual position of the at least one eye, so that facial recognition by the facial recognition system is stymied.

In a preferred embodiment of the invention, a second light displacer is also located adjacent the other at least one of the eyes of the individual but otherwise not covering other facial features the face. As with the first-mentioned light displacer, the second light displacer also optically displaces light passing therethrough radially relative to the original light direction, but with the emerging radially displaced light being parallel to the original light direction. Consequently, an image of the face of the individual obtained by the camera of the facial recognition system locates both eyes at the apparent positions, which is substantially different from an image which would have been obtained with the actual position of both eyes, so that facial recognition by the facial recognition system is stymied. Where two light displacers are used, each can displace the light laterally or medially, or a combination of various directions including upwards and downwards.

In one preferred embodiment of the invention, the object worn is a pair of glasses with the light displacer or light displacers located where the lenses of the pair of glasses would typically be located. The light displacer is conveniently: two mirrors which together serve to radially but parallelly displace light reflected thereby; a prism; or a pair of prisms which can be conventional prisms or Fresnel prisms or a combination of both. While the robustness of facial recognition systems vary, it is believed that displacing of the light by at least about 1 mm per eye, or 2 mm total, would be sufficient for satisfactory stymieing in most commercial situations.

It is an advantage of the present invention that an individual can change the appearance of their facial image as picked up by a camera of a facial recognition system without making the change apparent or noticeable to other passersby, and with this change thereby stymie recognition of their facial characteristics by the facial recognition system.

It is also an advantage of the present invention that the object which is worn to stymie the facial recognition system is a commonly worn object, so the use of the object to stymie would also not be apparent to passersby.

It is a further advantage of the present invention that the normal sight of the user is not affected.

It is still another advantage of the present invention that all features viewed by a facial recognition system through the light displacer will be displaced.

Other features and advantages of the present invention are stated in or apparent from detailed descriptions of presently preferred embodiments of the invention found hereinbelow.

DETAILED DESCRIPTION OF THE INVENTION

Figure 1:
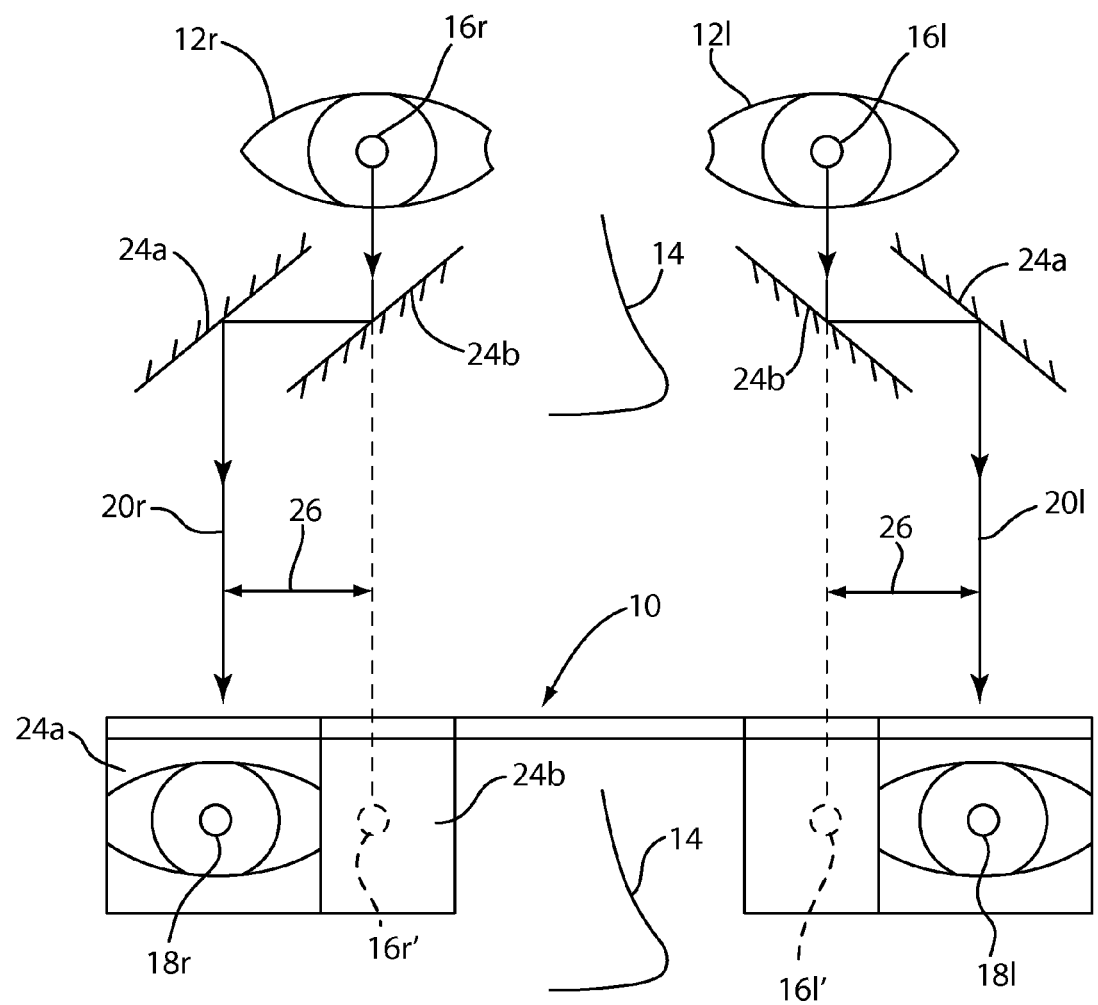
FIG. 1 is a front elevation view of a pair of glasses with the associated components shown schematically relative to the eyes of the user and is thus used for surreptitiously stymieing a facial recognition system in accordance with the present invention.

With reference now to the drawings in which like numerals represent like elements throughout the views, there is schematically depicted in FIG. 1 a pair of glasses 10 having a typical frame which is worn by an individual or user, which user is schematically depicted by eyes 12*l* and 12*r* and nose 14 only. It will be appreciated that glasses 10 are an exemplary embodiment of an object to be worn by the user for stymieing a facial recognition system in accordance with the present invention. While glasses 10 are considered the most likely object to be used for this purpose, other similar objects can also be used for the same effect which would be obvious to those of ordinary skill, such as a monocle, goggles, dark glasses (mostly for outside use) or a clip-on addition to normal glasses. But a simple pair of ordinary looking glasses is considered the preferred embodiment, since people wearing glasses are so ubiquitous, and so embodiments utilizing glasses 10 are described below to serve the purpose of surreptitiously stymieing a facial recognition system.

The schematic depiction in FIG. 1 shows eyes 12*l* and 12*r* (above glasses 10) of the individual as they would be imaged by a facial recognition system when not looking through glasses 10. In particular, the facial recognition system image would determine the correct or actual separation of pupils 16*l* and 16*r* (and/or other viewable features of or around the eyes, or the eyes as a whole, as desired, but for convenience reference is just made to the pupils hereafter) as viewed relative to one another and the locations of the eyes relative to nose 14 and any other selected anatomical points or features of the individual as typically utilized by the facial recognition system. Such an image would readily allow a proper identification of the individual by the facial recognition system if that individual was part of the facial recognition system database of individuals.

However, with glasses 10 appearing as normal glasses and being worn as usual by the user, the facial recognition system image would instead determine an incorrect (not actual) separation of pupils 16*l* and 16*r* (and all other features viewed through glasses 10), as viewed relative to one another, and their locations relative to nose 14 and other selected features of the individual as typically utilized by the facial recognition system. As shown, the image of glasses 10 obtained by the facial recognition system would show pupils 16*l* and 16*r* at apparent or perceived locations 18*l* and 18*r*, which as evident are different from the actual pupil positions 16*l'* and 16*r'* behind glasses 10 as shown in broken lines (that is, actual pupil positions 16*l'* and 16*r'* are where pupils 16*l* and 16*r* would have been imaged if not for the present invention and when regular glasses were worn). Such a distorted image would not readily allow a proper identification of the individual by the facial recognition system if that individual was part of the facial recognition system database of individuals, so that facial recognition of the individual would be stymied.

The present invention achieves this stymieing of the facial recognition system by shifting light beams 20*l* and 20*r* reflected from eyes 16*l* and 16*r* toward the camera or the like of the facial recognition system by use of light displacers 22*l* and 22*r*. As the construction and effects of light displacers 22*l* and 22*r* are the same, only light displacer 22*r* will be described in detail. Initially, it will be appreciated that light displacer 22*r* is depicted as it would be rotated 90° out of the page, in order to schematically show the effect light dispenser 22*r* has on light beam 20*r*. As thus shown, light displacer 22*r* includes two mirrors 24*a* and 24*b* which are mounted where lenses would normally be in glasses 10, and which mostly otherwise appear as lenses of glasses would appear since eye 12*r* of the user is mostly viewable.

As schematically shown in FIG. 1, mirrors 24 are carefully mounted or constructed relative to one another cause light beam 20*r* to be displaced radially relative to the original light beam 20*r* direction (in this case laterally or rightward) but otherwise parallel relative to the original light beam 20*r* direction and parallel to the direction of other light reflected from the face to the camera, such as from nose 14. As a result of this radial but parallel displacement, it will be important to appreciate that the user's view as seen through eye 12*r* and light displacer 22*r* is not distorted, so the user is not discomforted nor does the user have any perception problems relating to the user's normal vision. However, for a camera of the facial recognition system, there is a perceived pupil position 18*r* of pupil 16*r* of eye 12*r* viewed through glasses 10 which is different (radially displaced) from the actual pupil position 16*r'* shown by broken lines (or an actual position of eye 12*r* which is not shown by broken lines for convenience) which would be seen with normal lenses in glasses (or without glasses 10). The perceived pupil position 18*r* is thus seen to be shifted rightward or laterally relative to the actual pupil position 16*r'* (or actual right eye position), and this shifting distance is shown by distance arrow 26. This shifting is relative to other features of the face perceived by the camera by reflected light not passing through light displacer 22*r* as well.

In operation, by use of light displacer 22*r*, an image of the face of the individual obtained by the camera of the facial recognition system locates eye 12r or pupil 16r at the apparent position identified by perceived pupil position 18r. This perceived pupil position 18r is substantially different from an image which would have been obtained with the actual pupil position 16r' shown for pupil 16r of eye 12r without light displacer 22r, so that facial recognition by the facial recognition system is stymied by having improper or incorrect data. The lateral displacement is schematically shown by distance arrow 26.

A similar displacement is achieved by light displacer 22l as noted above for light dispenser 22r and as shown. While one displacement using only one light displacer 22 would be possible and effective, in the preferred embodiment, paired light displacers 22l and 224 are used for double the displacement effect as shown and to maintain the same symmetry of the location of the eyes of the user. It will also be appreciated that due to having light beams going through light displacers 22 ending up parallel when the light beams leave light displacers 22, the vision of the user is not distorted, and those viewing the user's face would not see the eyes or face as having been distorted since there is a wide variety of pupil spacings in the human population.

In the exemplary embodiment of the present invention in FIG. 1, the appearance of the back or non-mirrored side of mirror 24b in glasses 10 will be potentially appear a little abnormal to a viewer, since the back side would not be transparent. The amount of this abnormal appearance is exaggerated in FIG. 1 for convenience, and thus in an actual embodiment would be more modest. And while the mirrored side of mirror 24a would not be transparent either, the viewable portion would appear as if it were transparent since a viewer will simply see the eye (in mirror 24a) as expected behind the normal appearing glasses 10, without any indication that a mirror is present and that the eye location has been displaced. It will also be appreciated that the size and effect of mirrors 24 have been exaggerated for an easier explanation of the effects achieved.

Figure 2:
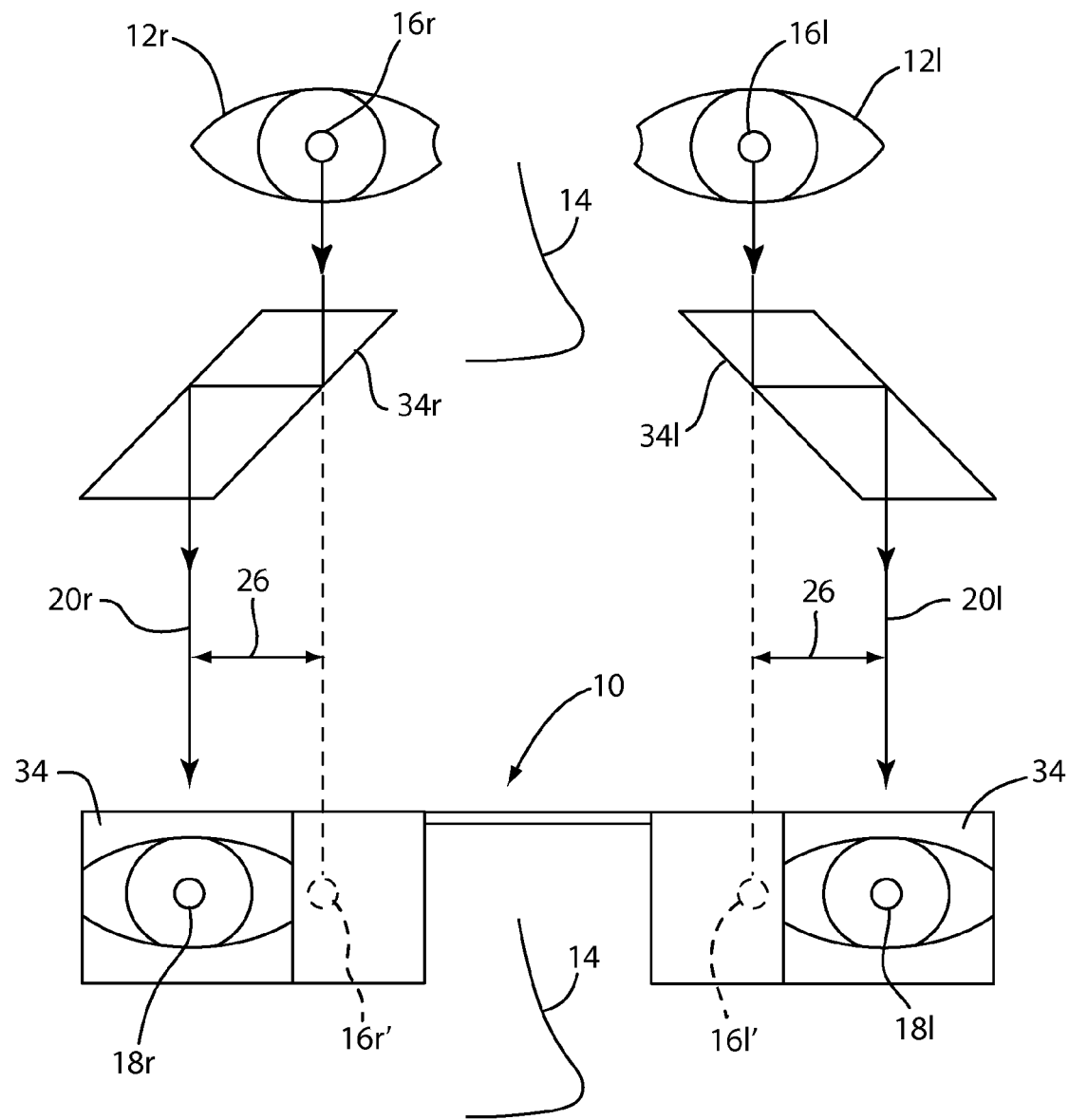
FIG. 2 is a front elevation view of an alternative embodiment of a pair of glasses with the associated components shown schematically as in FIG. 1.

Depicted in FIG. 2 is a more preferred embodiment of the present invention which eliminates somewhat the problem of an appearance of a non-transparent portion being viewed in glasses 10. In this embodiment, which is thus considered more practical, the same elements have been labeled with the same numbers as in FIG. 1. Thus, it will be seen that this FIG. 2 embodiment utilizes, instead of mirrors 24, oblique rectangular prisms 34l and 34r which effect an internal reflection of light beams 20l and 20r. The effect of prisms 34 is thus the same as mirrors 24, in that the light beams 20l and 20r are internally reflected therein and hence radially shifted as shown by distance arrow 26; and thus there are perceived pupil positions 18l and 18r which are different from actual pupil positions 16l' and 16r'. In this embodiment, there would still be a small area adjacent the nose of glasses 10 where no reflected light is seen to pass through prisms 34. But as this area would seem to be transparent, it would appear to be simply a distorted part of what would be assumed by a viewer to be a lens of glasses 10, and so it is submitted that it would raise little attention.

Figure 3:
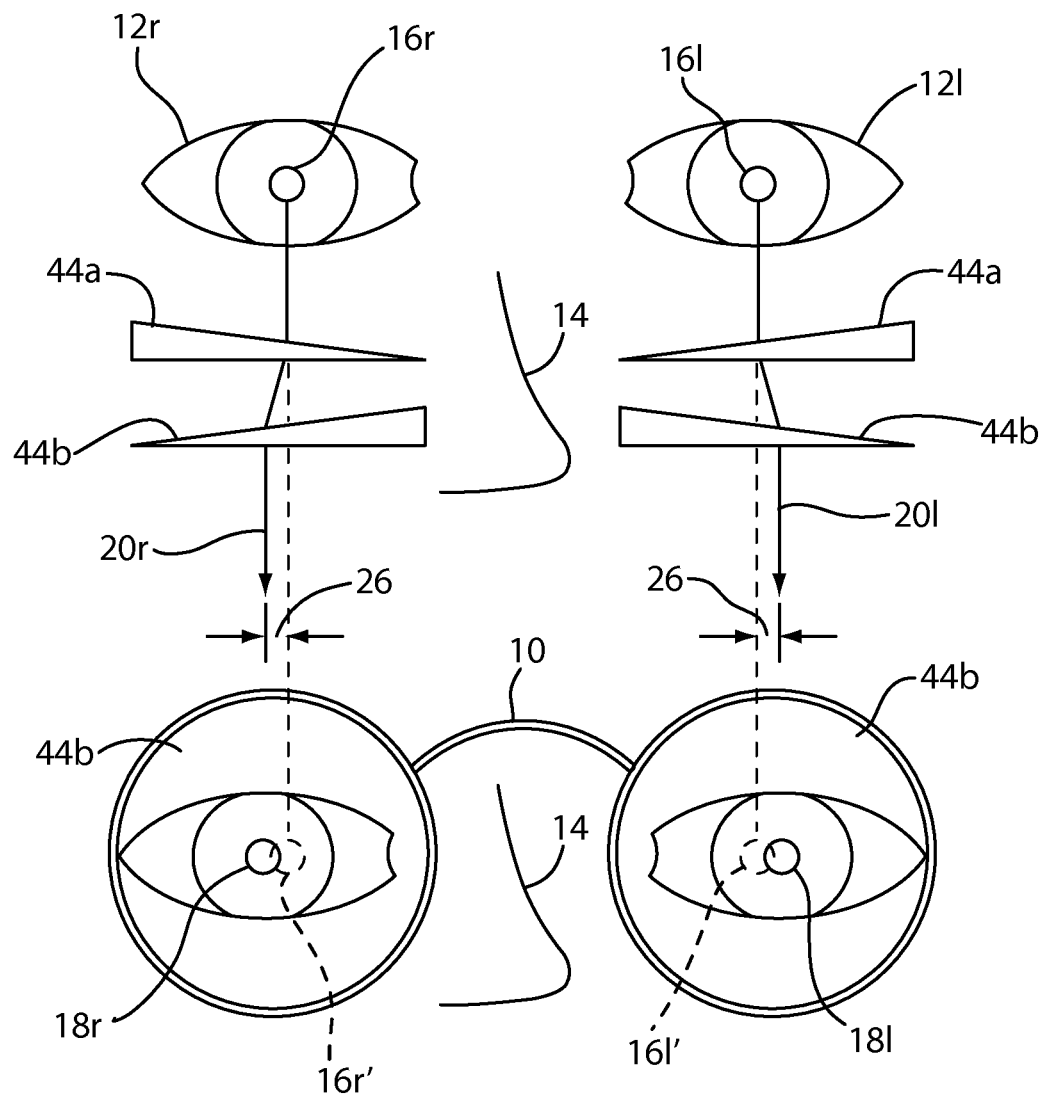
FIG. 3 is a front elevation view of another alternative embodiment of a pair of glasses with the associated components shown schematically as in FIG. 1.

In another more preferred embodiment depicted in FIG. 3, the problem of an appearance of a non-transparent or distorted portion being seen next to the nose of glasses 10 is eliminated. In this embodiment, which is thus considered still more practical, the same elements have been labeled with the same numbers as in FIGS. 1 and 2. Thus, it will be seen that this FIG. 3 embodiment utilizes, instead of mirrors 24 or prisms 34, paired right triangular prisms 44a and 44b which are shown spaced apart. Each prism 44a and 44b effects an equal but opposite deflection of light beams 20l and 20r, so that together radial but parallel displacement of light beams 20l and 20r is achieved as shown. The effect of prisms 44a and 44b is thus the same as in the previous embodiments, in that the light beams 20l and 20r are shifted as shown by distance arrow 26; and thus there is a perceived pupil position 18l and 18r which is different from the actual pupil position 16l' and 16r'. Since prisms 44a and 44b would have a small thickness, there would effectively be no area adjacent the nose where no reflected light is seen to pass through, so that prisms 44a and 44b would appear to be a part of what would be assumed to be a normal lens of glasses 10 and thus they would raise no attention from a viewer.

Figure 4:
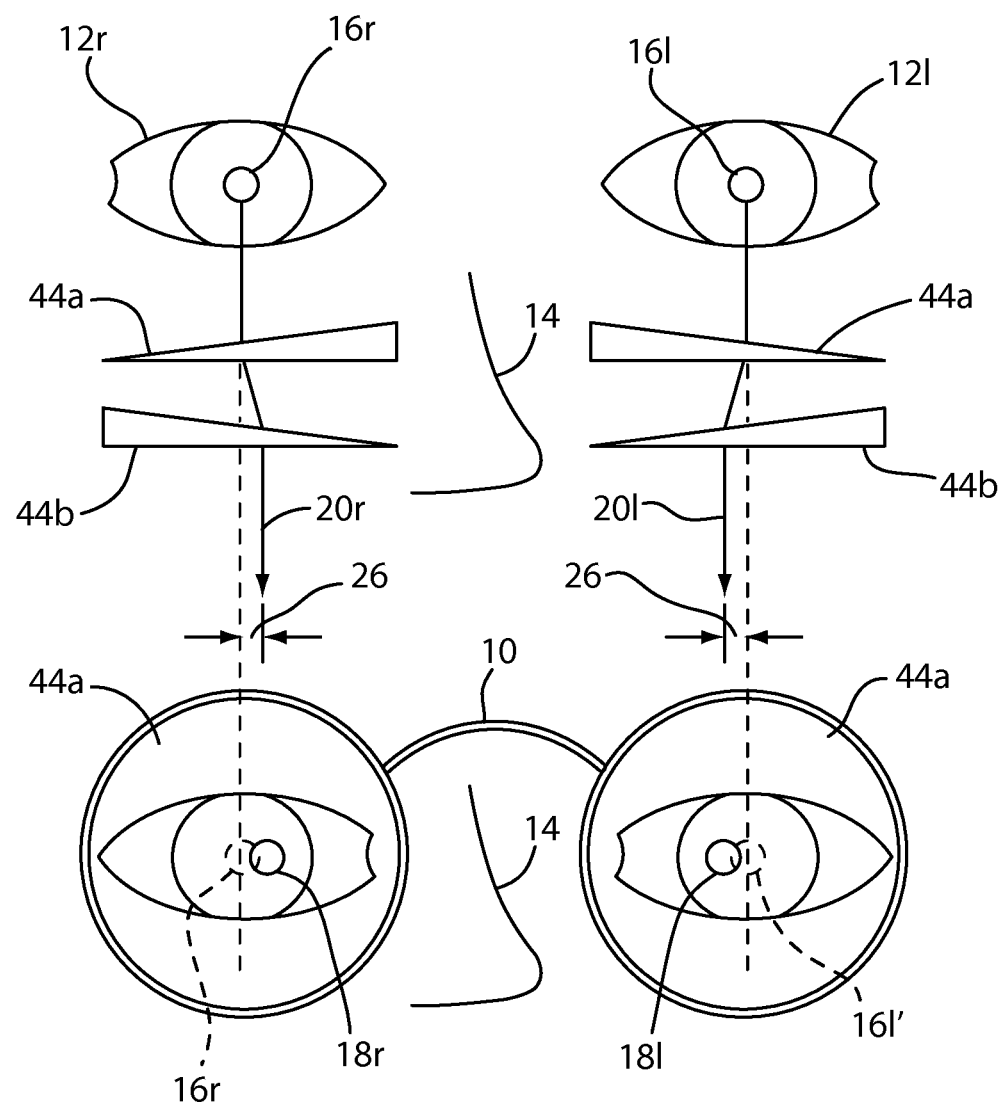
FIG. 4 is a front elevation view of still another alternative embodiment of a pair of glasses with the associated components shown schematically as in FIG. 1.

In still another preferred embodiment depicted in FIG. 4, a setup similar to that of FIG. 3 is employed and utilized to the same basic effect and with the same elements labeled with the same numbers as in FIGS. 1, 2 and 3. However, it will be appreciated that in this embodiment, instead of shifting or displacing pupils 16 radially outward (laterally), pupils 16 are shifted radially inward (medially) as shown. This is achieved by reversing the positions of prisms 44a and 44b from that shown in FIG. 3.

As noted above, it is a critical feature of the present invention that the visual axis of the user is not disturbed, so that only small radial but ultimately parallel displacements of light beams are effected. It will thus be appreciated that while the displacements described above have all been radially rightward or leftward (lateral or medial), it is also within the scope of the present invention to effect upward and/or downward displacements, or any combination of the same or different (e.g., up and left for one eye, down and left for the other eye) radial displacements from the normal viewing axis. It is also considered that only one pupil (or eye) displacement might be sufficiently effective, but that two symmetrical displacements would be more effective and appear less artificial even upon closer scrutiny.

The various elements of the embodiments shown in the figures, and the size of displacement arrows 26 of light beams 20, have been depicted for ease of illustration and are not necessarily to any scale. It will be appreciated that a minimum displacement of a light beam by at least about 1 mm per eye (but not in the same direction), or 2 mm total for only one eye, is considered to be sufficient for most commercial situations where the present invention would be used. However, a displacement of at least about 2 mm per eye or 4 mm total would be preferred for surer stymieing. And while greater displacements are possible, it is also considered that a single displacement of no more than about 5 mm per eye, or 1 cm total, would be more than a sufficient distance for satisfactory stymieing in most commercial situations.

Obviously, greater displacements are possible, and different embodiments would lend themselves to different displacements. For example, the embodiment of FIG. 1 where mirrors are used for the light displacers could achieve an eye displacement greater than a centimeter, though at some point beyond a centimeter of displacement the glasses 10 would not look much like a normal pair of glasses and that would not be desired. Similar large displacements could be achieved with the embodiment of FIG. 2 using oblique rectangular prisms, with the same limitation on size of displacement versus appearance. The embodiments of FIGS. 3-5 provide a more limited displacement relative to the other two embodiments. However, these embodiments are considered to be the more practical embodiments, or the more likely commercial embodiments, since the above noted minimum and maximum displacements are still easily achieved but with a more normal appearance of glasses 10.

Various light displacers have been disclosed above, but it will be appreciated that other light displacers with the same effects are also possible. For example, a Fresnel element(s) achieving a light displacement as described above could be used for a relatively thinner light displacer. Of course, Fresnel elements are seen to have small visible lines therein due to the grooves thereof, and so this appearance would be somewhat of a drawback to their use in a surreptitious system.

Thus, while the present invention has been described with respect to exemplary embodiments thereof, it will be understood by those of ordinary skill in the art that variations and modifications can be effected within the scope and spirit of the invention.

I claim:

1. A method for altering facial characteristics of an individual, said method comprising the steps of:
   wearing an object by the individual in front of the eyes of the individual, the object including a light displacer located in front of at least one of the eyes of the individual but otherwise not covering other facial features the face, altering the facial appearance of the individual by altering an observable position of the at least one eye (i) relative to other features of the face of the individual wearing the object and (ii) relative to the actual position of the at least eye;
   optically displacing, light passing from a side of the light displacer facing towards the face of the individual when worn, to an opposite side, through the light displacer, in a radial direction relative to the original light direction but with the emerging radially displaced light being parallel to the original light direction, so that a view by the individual through the light displacer is not distorted, wherein said light passing through the light displacer including light reflected from at least one of the eyes of the individual; and
   detecting the light reflected as an image by a camera located in front of the object, opposite a side adjacent the individual wearing the object, wherein the portion of the image containing the eye covered by the object is displaced so that the apparent position of the eye in the image is shifted i) relative to other features of the face perceived by the camera by light not passing through the light displacer and ii) relative to the actual position of the eye, and thus observing altered facial characteristics of the individual present in the image due to the individual wearing the object.

2. A method for surreptitiously stymieing a recognition of facial characteristics of an individual by a facial recognition system as claimed in claim 1:
   wherein said wearing step further includes the step of providing a second light displacer located in front of the other at least one of the eyes of the individual when worn by the individual but otherwise not covering other facial features; and
   further including the steps of:
      optically displacing, with the second light displacer, a second light passing therethrough radially relative to the original light direction but with the emerging radially displaced light being parallel to the original light direction,
      detecting the light reflected as part of the image obtained along with the light passing through the first light displacer, by the camera;
      wherein there is an apparent position of the other at least one eye which is shifted i) relative to other features of the face perceived by light not passing through the second light displacer, and ii) relative to the actual position of the other at least one eye;
   whereby an image of the face of the individual obtained by the camera of the facial recognition system locates the other at least one eye at the apparent position which is substantially different from an image which would have been obtained with the actual position of the other at least one eye, so that facial recognition by the facial recognition system is additionally stymied.

3. A method for surreptitiously stymieing a recognition of facial characteristics of an individual by a facial recognition system as claimed in claim 1, wherein the object worn is a pair of glasses with the light displacer located where one of the lenses of the pair of glasses would typically be located.

4. A method for surreptitiously stymieing a recognition of facial characteristics of an individual by a facial recognition system as claimed in claim 2, wherein the object worn is a pair of glasses with the first-mentioned and second light displacers are respectively located where the lenses of the pair of glasses would typically be located.

5. A method for surreptitiously stymieing a recognition of facial characteristics of an individual by a facial recognition system as claimed in claim 1, wherein the light displacer includes one of: two mirrors which together serve to radially but parallelly displace light reflected thereby, a prism, or a pair of prisms.

6. A method for surreptitiously stymieing a recognition of facial characteristics of an individual by a facial recognition system as claimed in claim 1, wherein said displacing step displaces the light by at least about 1 mm.

7. A method for surreptitiously stymieing a recognition of facial characteristics of an individual by a facial, recognition system as claimed in claim 2, wherein the first-mentioned and second light displacers each displace the associated light laterally.

8. A method for surreptitiously stymieing a recognition of facial characteristics of an individual by a facial recognition system as claimed in claim 2, wherein the first-mentioned and second light displacers each displace the associated light medially.

9. A device worn by an individual to alter the facial appearance of an individual when viewed by a camera spaced away from and in front of, opposite a side of an individual wearing the device, of the facial recognition system, said device comprising:
   an object which is worn by the individual, said object including
      a light displacer, located in front of at least one of the eyes of the individual, said light displacer, when worn by the individual, optically displacing light passing there through radially relative to an original light direction but with the emerging radially displaced light being parallel to the original light direction
      and so that a view by the individual through the light displacer is not distorted, the light displacer, when worn by an individual, altering an observable facial appearance of the individual by altering an observable position of the at least one eye, (i) relative to other features of the face of the individual wearing the object and (ii) relative to the actual position of the at least eye;
   whereby light reflected from the at least one of the eyes of the individual and passing through said light displacer to a camera spaced away from and in front of, opposite a side of an individual wearing the device, is displaced radially but parallel relative to a direction of the reflected light to the camera so that a) a view by the at least one eye through said light displacer is not distorted, and b) there is an apparent position of the at least one eye perceived by the camera viewing through said light displacer which is shifted i) relative to other features of the face perceived by the camera by light not passing through the light displacer and ii) relative to the actual position of the at least one eye; and whereby an image of the face of the individual obtained by the camera of a facial recognition system locates the at least one eye at the apparent position which is substantially different from an image which would have been obtained with the actual position of the at least one eye were the individual not wearing the object, resulting in an observed altered facial characteristics of the individual present in the image due to the individual wearing the object.

10. A device worn by an individual to disrupt recognition as claimed in claim 9, wherein said object is a pair of glasses, and wherein said light displacer is located where one of the lenses of the pair of glasses would typically be located.

11. A device worn by an individual to disrupt recognition as claimed in claim 9, wherein said light displacer includes two mirrors which together serve to radially but parallelly displace light reflected thereby.

12. A device worn by an individual to disrupt recognition as claimed in claim 9, wherein said light displacer is a prism.

13. A device worn by an individual to disrupt recognition as claimed in claim 9, wherein said light displacer is a pair of prisms.

14. A device worn by an individual to disrupt recognition as claimed in claim 9, wherein there are a left and a right said light displacers, said left and right light displacers being located where the left and right lenses of the pair of glasses would be expected to be found.

15. A device worn by an individual to disrupt recognition as claimed in claim 9, wherein said light displacer displaces the light by at least about 1 mm.

16. A pair of glasses which is worn by an individual to alter the facial appearance of an individual by altering an observed location of the eyes of the individual wearing the glasses as well as the location of other facial features of the individual when viewing the individual wearing the glasses, said pair of glasses comprising:
a glasses frame;
a first lens mounted in said frame to be in front of a first eye of the individual when said glasses frame is worn by the individual, said first lens displacing light passing there through radially relative to an original light direction but with the emerging radially displaced light being parallel to the original light direction and so that a view by the individual through the light displacer is not distorted, whereby light reflected from the first eye of the individual and passing through said first lens to a camera located in front of the glasses is displaced radially but parallel relative to a direction of the reflected light to the camera so that
a) a view by the first eye through the first lens is not distorted, and
b) there is an apparent position of the first eye perceived by the camera viewed through said first lens which is shifted i) relative to other viewed features of the face perceived by the camera by light not passing through the light displacer and ii) relative to the actual position of the first eye; and
a second lens mounted in said frame to be adjacent a second eye of the individual;
whereby an image of the face of the individual obtained by the camera of the facial recognition system locates the first eye at the apparent position which is thus substantially different from an image which would have been obtained with the actual position of the first eye, so that facial characteristics of the individual wearing the glasses is altered.

17. A pair of glasses which is worn by an individual to disrupt recognition as claimed in claim 16, wherein said light displacer is a prism or a pair of prisms.

18. A pair of glasses which is worn by an individual to disrupt recognition as claimed in claim 16, wherein there are a left and a right said light displacers, said left and right light displacers being located where the left and right lenses of the pair of glasses would be expected to be found.

19. A pair of glasses which is worn by an individual to disrupt recognition as claimed in claim 18, wherein said left and right light displacers each displace the associated light one of laterally or medially.

20. A pair of glasses which is worn by an individual to disrupt recognition as claimed in claim 16, wherein said first lens displaces the light by at least about 1 mm.

21. The method of claim 1, further the comprising:
obtaining an image of the face of the individual by the camera of the facial recognition system; and
locating at least one eye at the apparent position which is substantially different from the actual position of the at least one eye, so that facial recognition by the facial recognition system is stymied.

22. The device of claim 9, wherein a majority of light through the light displacer is optically displaced, in a same direction, radially parallel to the original light direction.

* * * * *